Patented June 6, 1939

2,160,943

UNITED STATES PATENT OFFICE 2,160,943

VINYLIDENE CHLORIDE CO-POLYMERS

Edgar C. Britton and Clyde W. Davis, Midland, Mich., assignors to The Dow Chemical Company, Midland, Mich., a corporation of Michigan No Drawing. Application May 2, 1938, Serial No. 205,528

14 Claims. (Cl. 260—86)

This application is a continuation-in-part of our co-pending application Serial No. 142,424, filed May 13, 1937, which was directed primarily to co-polymers of vinylidene chloride and divinyl ether.

The present invention relates to the product obtained by polymerizing together monomeric vinylidene chloride and a monomer of at least one unsaturated aliphatic ether having the general formula R—O—R' wherein R is a member of the class consisting of the vinyl, allyl, 2-methyl allyl, 2-chloro-allyl, and allyloxy methyl radicals, and R' is a member of the class consisting of R, the lower alkyl radicals, the 2-chloroethyl, the 2-hydroxy-ethyl, and the epoxypropenyl radicals.

We have discovered that useful synthetic resinous and plastic products possessing desirable physical characteristics can be obtained by polymerizing together vinylidene chloride and at least one of the unsaturated aliphatic ethers defined above at temperatures from slightly above room temperature to about 100° C. The products so obtained are herein referred to as co-polymers. The polymerization is advantageously carried out in the presence of materials capable of accelerating the normal rate of polymerization of the two or more monomeric liquids from which the co-polymer is produced. Examples of such catalytic materials include, in addition to light and heat, benzoyl peroxide, a mixture of the latter with chloroacetyl chloride and tetraethyl lead, or a mixture of the uranium nitrate or acetate and benzoyl peroxide, and the like. When uranium salts are employed in the catalyst mixture, the polymerizable materials are ordinarily subjected to the radiant energy from a mercury vapor lamp during the co-polymerization reaction.

The time required to produce a satisfactory co-polymer varies from a few hours to about 3 weeks or more, depending upon the activity of the particular mixture and the condition of light and heat to which the mixture was subjected. The properties of the so-formed co-polymers vary from gel-like materials to spongy solids and through bone-like substances to hard, brittle masses. Most of the products obtained were capable of being molded easily at moderate working temperatures. When compared with the properties of polymeric vinylidene chloride alone, this is particularly advantageous since polymeric vinylidene chloride has a softening point of about 185° C. whereas the softening point of most of the various co-polymers herein reported were below 150° C. In most cases the decomposition temperature of the co-polymer is substantially the same as that of polymeric vinylidene chloride itself. The useful working range of temperatures, then, in the case of the co-polymers, is substantially greater than that of the vinylidene chloride polymer.

Our new co-polymers, in general, are insoluble in ortho-dichlorobenzene and most other common organic solvents at room temperature. A few of the co-polymers have been found to swell under the action of ortho-dichlorobenzene at its boiling point and in a few isolated instances there appears to be some actual solution or dispersion of the co-polymer in that solvent. Co-polymers of vinylidene chloride and unsaturated aliphatic ethers having a single unsaturated linkage are more readily dispersed in hot solvents than are those wherein the ether contains two unsaturated groups. The insolubility of most of our co-polymers in ortho-dichlorobenzene and similar solvents is an indication of their general utility in the preparation of solvent-proof compositions.

Many of our new co-polymers are highly resistant to attack by concentrated sulphuric acid and while some of the products discolor slightly on long standing in this reagent they do not appear to be decomposed thereby to any appreciable extent. In general, the co-polymers defined by the appended claims are, when molded, highly resistant to most common acids and aqueous alkalies and to most of the common organic solvents including the alcohols, hydrocarbons, chlorinated hydrocarbons, ketones, etc.

Among the co-polymers of vinylidene chloride with unsaturated aliphatic ethers which we have prepared are those wherein the ether is divinyl ether, ethyl vinyl ether, 2-chloroethyl vinyl ether, 2-hydroxy-ethyl vinyl ether, allyl ethyl ether, 2-methyl-allyl ethyl ether, 2-methyl-allyl n-propyl ether, 2-methyl-allyl 2'-hydroxy-ethyl ether, di-(2-methyl-allyl) ether, 2-chloro-allyl ethyl ether, di-(allyloxy-methyl) ether, 2-methyl-allyloxy-propylene oxide, and the like. In each of the foregoing compounds there is at least one unsaturated group conforming to the definition of the radical R in the general formula given above.

The following examples serve to illustrate the practice of our invention but are not to be construed as limiting the scope thereof:

Example 1

A series of experimental runs were carried out employing varying ratios of vinylidene chloride and divinyl ether. In runs 1 and 2 of Table I there was added to the mixture 1.5 parts by weight of a catalyst composed of equal parts of benzoyl peroxide, chloroacetyl chloride, and tetraethyl lead for each 100 parts of the divinyl ether-vinylidene chloride mixture. In all of the other runs the catalyst employed was 0.5 part of benzoyl peroxide for each 100 parts of the divinyl ether-vinylidene chloride mixture. In every instance the mixture was sealed in a pressure vessel and subjected to a temperature of 40° C. for the time specified in the table. At the end of this time the vessel was opened and the contents thereof was mixed with benzene or other inert solvent for the monomeric vinylidene chloride and divinyl ether remaining therein, and the mixture was filtered to separate the insoluble co-polymeric composition from the solution of unpolymerized materials. This procedure is preferable to methods requiring distillation of the unpolymerized materials, since co-polymerization had been effected without special heat-stabilizing agents for the co-polymer. We have found that co-polymers of vinylidene chloride and divinyl ether, unless stabilized by admixing therewith various heat-stabilizing agents are subject to considerable decomposition if heated to temperatures above about 170° C.

The following table describes the conditions employed and the co-polymeric composition obtained in one series of our runs:

Table I

| Run No. | Starting materials | | | | Time, days | Co-Polymeric Composition | | | | | | |
|---|---|---|---|---|---|---|---|---|---|---|---|---|
| | Vinylidene chlorine | | Divinyl ether | | | Weight of co-polymer, percent of weights of reagents | Combined chlorine, percent | Vinylidene chloride | | Divinyl ether | | |
| | Weight, percent | Mol, percent | Weight, percent | Mol, percent | | | | Weight, percent | Mol, percent | Weight, percent | Mol, percent | |
| 1 | 90 | 86.6 | 10 | 13.4 | 1 | | | | | | | |
| 2 | 80 | 74.2 | 20 | 25.8 | 1 | | | | | | | |
| 3 | 70 | 62.7 | 30 | 37.3 | 15 | 82.0 | 57.0 | 78.0 | 72.0 | 22.0 | 28.0 | |
| 4 | 60 | 52.4 | 40 | 47.6 | 8 | 65.3 | 47.5 | 64.9 | 57.1 | 35.1 | 42.9 | |
| 5 | 50 | 42.0 | 50 | 58.0 | 8 | 53.3 | 47.1 | 64.4 | 56.6 | 35.6 | 43.3 | |
| 6 | 40 | 32.4 | 60 | 67.6 | 8 | 53.8 | 43.2 | 59.0 | 51.0 | 41.0 | 49.0 | |
| 7 | 30 | 23.6 | 70 | 76.4 | 7 | 43.6 | 36.7 | 50.0 | 41.9 | 50.0 | 58.1 | |

The product of run 1 was a white powdery co-polymer having a softening point of 130° C. and a decomposition point of about 174° C. A white solid co-polymer was also obtained from run 2, but there was evidence that the reaction had not been continued for a sufficient length of time to attain the desired degree of completeness, as relatively small amounts of product were obtained in runs 1 and 2. For this reason the reaction period was increased in the following experiments and a more complete reaction obtained. It is to be observed that the product of run 3 had a molecular ratio of approximately 3 vinylidene chloride groups to each divinyl ether group in the co-polymer. As is to be expected this ratio decreased as the amount of divinyl ether in the starting material was increased. It is noteworthy, however, that the products of runs 4 and 5 were nearly identical as to their composition, both representing a co-polymer wherein approximately 4 vinylidene chloride groups and 3 divinyl ether groups were co-polymerized. This appears to be a critical composition in the series and to represent a composition obtainable from a surprisingly wide range of compositions of the unpolymerized starting mixture. This same product was obtained from mixtures containing from 50 to 60 per cent vinylidene chloride.

Example 2

In a manner analogous to that described in the preceding example vinylidene chloride was co-polymerized with 2-chloroethyl vinyl ether. Products ranging from viscous liquids to rigid, opaque solids were obtained. The following experiment is illustrative of the procedure employed and the product obtained when co-polymerizing vinylidene cholride and 2-chloroethyl-vinyl ether. A mixture of 75 per cent by weight of vinylidene chloride and 25 per cent of 2-chloroethyl-vinyl ether, both in monomeric form, was heated in a constant temperature bath to 40° C. for 48 hours in the presence of 0.5 per cent by weight of benzoyl peroxide as a catalyst. At the end of this period 24 per cent of the mixture of monomeric materials had polymerized to form a white, powdery product having a softening point of 149° C. and a decomposition point of 195° C. Analysis of the product showed it to contain 92.6 per cent vinylidene chloride co-polymerized with 7.4 per cent of 2-chloroethyl vinyl ether. This co-polymer was easily molded at temperatures from 140° to 160° C. to give substantially colorless and nearly transparent products which are tough, strong, and pliable. This particular co-polymer may be dispersed or partially dissolved in dioxane, xylene, or ortho-dichlorobenzene at their respective boiling points. Co-polymers prepared from 80:20, 85:15, 90:10, and 95:5 ratios of vinylidene chloride monomer to 2-chloroethyl vinyl ether were decreasingly soluble in the above-mentioned solvents. All of these materials, however, were readily molded at moderate working temperatures. Co-polymers prepared from 50:50 and 25:75 mixtures of the same materials were softer than the one described above, having slightly lower softening points. The most satisfactory products are those prepared from monomeric mixtures containing more than 50 per cent of vinylidene chloride.

Example 3

The following Table II further illustrates the practice of our invention and describes some of the principal properties of various other of our new co-polymers of vinylidene chloride and unsaturated aliphatic ethers of the class described. In the table, such ether is referred to as a "modifier" from its effect in modifying the properties of the co-polymer as prepared with those of polymeric vinylidene chloride itself. Proportions of reagents are given in per cent by weight and the amount of modifier entering into the co-polymeric product is calculated from the chlorine analysis of the co-polymer obtained.

merized vinylidene chloride and divinyl ether in the ratio of approximately 4 molecular propor- Table II

| Run No. | Co-polymerizable material | Percent modifier | Percent vinylidene chloride | Polymerization temperature, °C. | Time, hrs. | Extent of polymerization, percent | Properties of co-polymer | | | |
|---|---|---|---|---|---|---|---|---|---|---|
| | | | | | | | Chlorine content, percent | Vinylidene chloride, percent | Modifier, percent | Softening point, °C. |
| 1 | Allyl ethyl ether | 10 | 90 | 40 | 49 | 15.5 | 71.97 | 98.3 | 1.7 | 135 |
| 2 | do | 15 | 85 | 40 | 49 | 13.0 | 70.92 | 96.8 | 3.2 | 120 |
| 3 | do | 20 | 80 | 40 | 67 | 10.0 | 69.75 | 95.3 | 4.7 | 120 |
| 4 | Ethyl 2-methylallyl ether | 10 | 90 | 40 | 46 | 9.0 | 69.25 | 94.6 | 5.4 | 120 |
| 5 | 2-methylallyl n-propyl ether | 10 | 90 | 40 | 46 | 13.5 | 69.94 | 95.4 | 4.6 | 130 |
| 6 | 2'-hydroxy-ethyl 2-methylallyl ether | 10 | 90 | 40 | 46 | 15.5 | 69.66 | 95.2 | 4.8 | 130 |
| 7 | Di-(2-methylallyl) ether | 10 | 90 | 40 | 221 | 22.2 | 70.25 | 93.2 | 6.8 | 140 |
| 8 | 2-chloroallyl ethyl ether | 15 | 85 | 40 | 44 | 30.0 | | | | 130 |
| 9 | do | 20 | 80 | 40 | 67 | 29.5 | 66.78 | 91.3 | 8.7 | 135 |
| 10 | Di-(allyloxy-methyl) ether | 25 | 75 | 30° for 66 hrs. 60° for 5 hrs. | | | | | | |
| 11 | 2-methylallyl-oxy-propylene oxide | 25 | 75 | 30° for 66 hrs. 60° for 12 hrs. | | 35.0 | 61.60 | 84.2 | 15.8 | 130 |

While this invention contemplates principally the co-polymers from a binary polymerizable mixture of vinylidene chloride and the previously defined unsaturated aliphatic ethers, it also includes co-polymers from polynary polymerizable mixtures comprising vinylidene chloride, at least one ether of the type previously defined, and one or more additional polymerizable materials. For example, co-polymers of the type herein described may be further modified in their properties by incorporating varying amounts of vinyl esters, styrene, or the lower alkyl esters of acrylic or methacrylic acid in the monomeric mixture prior to polymerization.

The co-polymers of vinylidene chloride and the unsaturated aliphatic ethers are somewhat thermoplastic in themselves but this characteristic can be considerably modified and their properties as molding resins improved by adding a plasticizer thereto either before or after co-polymerization, depending on the effect such materials may have on the polymerization rate of the monomers or on the properties of the finished co-polymer. In a like manner, other effect materials such as coloring agents and fillers may be added if desired.

Other modes of applying the principle of our invention may be employed instead of those explained, change being made as regards the materials employed, provided the step or steps or the product recited in the following claims be thereby carried out or obtained.

We therefore particularly point out and distinctly claim as our invention:

1. A co-polymer of vinylidene chloride and other materials polymerizable therewith, at least one of which is an unsaturated aliphatic ether having the formula R—O—R' wherein R is a member of the class consisting of the vinyl, allyl, 2-methyl-allyl, and allyloxy-methyl radicals, and R' is a member of the class consisting of R, the lower alkyl radicals, the 2-chloroethyl, 2-hydroxy-ethyl, and epoxy-propenyl radicals.

2. A co-polymer of vinylidene chloride and divinyl ether.

3. A plastic composition comprising co-polymerized vinylidene chloride and divinyl ether.

4. A plastic composition comprising co-polymerized vinylidene chloride and divinyl ether in the ratio of approximately 4 molecular proportions of vinylidene chloride and 3 molecular proportions of divinyl ether.

5. A co-polymer of vinylidene chloride and 2-chloroethyl vinyl ether.

6. A plastic composition comprising co-polymerized vinylidene chloride and 2-chloroethyl vinyl ether.

7. A co-polymer of vinylidene chloride and allyl ethyl ether.

8. The process which comprises heating together vinylidene chloride and an unsaturated aliphatic ether defined in claim 1, for from one day to three weeks.

9. The process which comprises heating together vinylidene chloride and an unsaturated aliphatic ether defined in claim 1 in the presence of a peroxide-containing catalyst for accelerating the polymerization of said materials.

10. The process which comprises mixing vinylidene chloride with an unsaturated aliphatic ether defined in claim 1 and a peroxide-containing catalyst for accelerating the rate of polymerization of these materials, and heating the mixture at a temperature between about 30° and about 100° C. to effect co-polymerization of the materials.

11. The process which comprises heating together divinyl ether and vinylidene chloride for from 1 to 15 days.

12. The process which comprises heating together divinyl ether and vinylidene chloride in the presence of a peroxide-containing catalyst for accelerating the polymerization of said materials.

13. The process which comprises mixing divinyl ether with vinylidene chloride and a peroxide-containing catalyst for accelerating the rate of polymerization of these materials, and heating the mixture at a temperature between about 30° and about 100° C. to effect polymerization of the materials.

14. The process which comprises mixing divinyl ether with vinylidene chloride and heating the mixture in the presence of benzoyl peroxide at a temperature between about 30° and about 100° C. to effect co-polymerization.

EDGAR C. BRITTON.
CLYDE W. DAVIS.